(No Model.)

J. C. BROWN.
NUT LOCK.

No. 521,845. Patented June 26, 1894.

Witnesses:
W. C. Corlies
Jno. A. Christianson

Inventor:
Julius C. Brown
By Louis K. Gillson
His Attorney

UNITED STATES PATENT OFFICE.

JULIUS C. BROWN, OF SANTA BARBARA, CALIFORNIA.

NUT-LOCK.

SPECIFICATION forming part of Letters Patent No. 521,845, dated June 26, 1894.

Application filed May 9, 1894. Serial No. 510,596. (No model.)

*To all whom it may concern:*

Be it known that I, JULIUS C. BROWN, a citizen of the United States, residing at Santa Barbara, in the county of Santa Barbara and State of California, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to nutlocks as applied to railway track construction. Its object is to secure a nutlock that is positive in its action, and absolute protection against the loosening of the nut, cheap in construction, easy of application and convenient of disengagement.

It consists of the use of a key of angle iron, having one of its edges thickened, and being adapted to rest in the angle of the fish plate so that one of its leaves is held by the nut; and of a special form of washer having a finger adapted to be bent over the end of the key so as to prevent its withdrawal.

Figure 1:
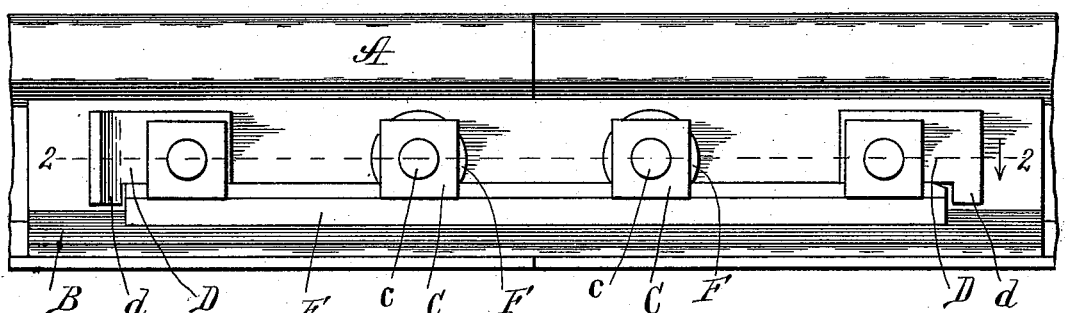
Figure 2:
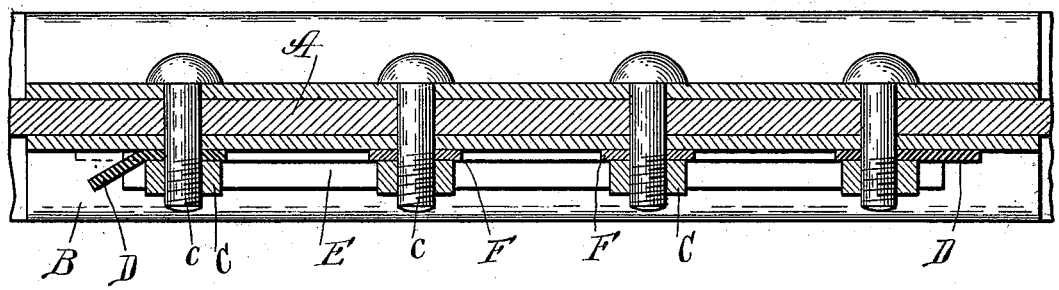
Figures 3, 4:
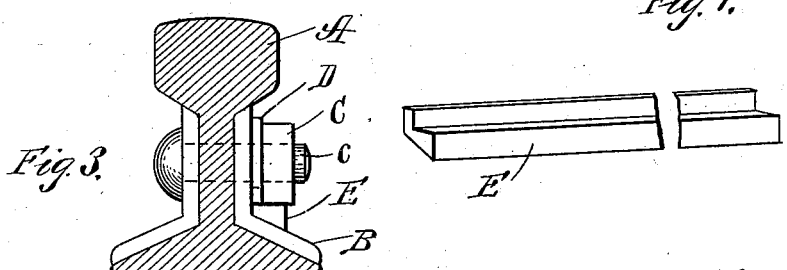
Figure 5:
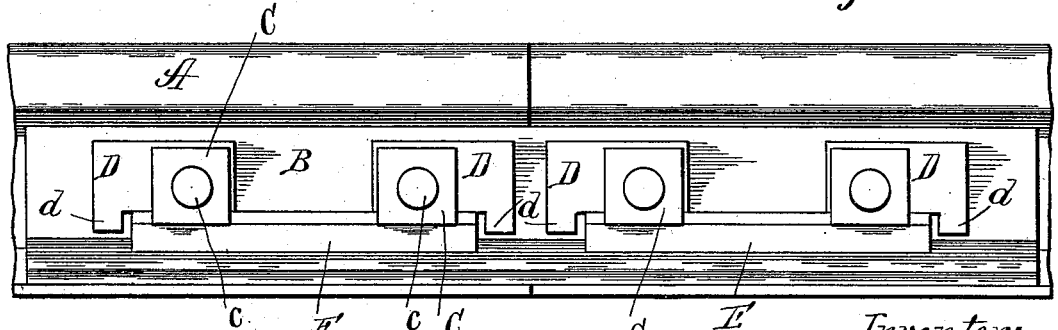

In the drawings, Figure 1, is an elevation of a portion of railway track showing the nutlock in use. Fig. 2, is a plan section on the line 2—2, of Fig. 1. Fig. 3 is a transverse sectional view of the rail, showing the end of the nutlock in elevation. Fig. 4 is a perspective of the key. Fig. 5, is a side elevation of a portion of the track, showing a modified form of applying the nutlock.

The rail is represented at A; the fish plate at B; the bolts at c; the special washer at D; and the key at E.

At F is shown a form of washer for use upon the inner bolts, that is, the bolts not at the ends of the key.

The key, E, is a piece of angle iron, the angle of its exterior surface being the same as that of the fish plate B, in conjunction with which it is to be used, so that it may rest snugly within the angle of the latter, one of its leaves being vertical and of sufficient width to extend to within a short distance of the bolts c, and to rest behind the nuts C, as a washer; its lower leaf is thickened so as to fill the space between the lower side of the nut C, and the foot of the fish plate B, and thus prevent the nut from turning. The key is inserted after the nuts have been turned up on the bolts as far as desired, and is then pushed in from one end of the fish plate, under and behind the several nuts, its length being slightly greater than the distance between the outer bolts. A washer D of special form is placed upon the outer bolts, its lower side being straight so that the key may pass under it. This washer D, is prolonged in one direction, and at its extension it has a downwardly projecting lug or finger, d. The extension of the washer applied to one of the outside bolts is bent so that when placed upon the bolt it will project away from the fish plate. The key is inserted behind the lug d, thus bent outwardly, and when in place abuts against the lug of the washer, D, at the farther end of the fish plate, which washer has been applied to the bolt without being bent. The bent washer D, is now flattened against the fish plate by the blow of a hammer and its lug falling behind the end of the key, E, prevents it from receding from its position. All of the washers are so formed that they extend but little below the bolts, so that the upper leaf of the key may be as wide as possible. The washers F, F, used upon the inner bolts do not require the extension shown upon the washers D, D. The lower face of the nut comes into contact with the lower leaf of the key when making the least movement upon the bolt, and hence is positively and securely locked.

Should it be desired to remove the bolts the extended end of one of the washers D, is bent outwardly by the use of a cold chisel sufficient to allow the withdrawal of the key E. The washers are preferably of malleable iron, so that they may be repeatedly bent without fracture.

Instead of a single key for all of the nuts of a fish plate, the nuts may be locked in pairs, as shown in Fig. 5, and this construction is especially adapted for use in connection with those makes of fish plates which have a strengthening rib midway of their length.

I claim as my invention—

In a nutlock to be used in conjunction with a fish plate, the combination with a key piece of uniform size throughout its length, and angular in cross section, and having one leaf adapted to lie behind the nuts and one leaf extending between the nuts and the foot of the fish plate, and a pair of washers each having a straight edge for contact with the top of the key piece, and a lug projecting perpendicular to such edge so as to prevent the longitudinal movement of the key piece, substantially as described and for the purpose specified.

In testimony whereof I affix my signature in presence of two witnesses.

JULIUS C. BROWN.

Witnesses:
LOUIS K. GILLSON,
SPENCER WARD.